(12) United States Patent
Pirotte et al.

(10) Patent No.: US 10,286,731 B2
(45) Date of Patent: May 14, 2019

(54) TIRE WITH ASYMMETRIC CROWN

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Pascal Pirotte, Clermont-Ferrand (FR); Christophe Egerszegi, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 284 days.

(21) Appl. No.: 14/654,790

(22) PCT Filed: Dec. 11, 2013

(86) PCT No.: PCT/EP2013/076165
§ 371 (c)(1),
(2) Date: Jun. 22, 2015

(87) PCT Pub. No.: WO2014/095505
PCT Pub. Date: Jun. 26, 2014

(65) Prior Publication Data
US 2015/0336427 A1    Nov. 26, 2015

Related U.S. Application Data
(60) Provisional application No. 61/768,947, filed on Feb. 25, 2013.

(30) Foreign Application Priority Data
Dec. 20, 2012  (FR) ..................... 12 62406

(51) Int. Cl.
B60C 9/30      (2006.01)
B60C 9/18      (2006.01)
(Continued)

(52) U.S. Cl.
CPC .............. B60C 9/30 (2013.01); B60C 9/1807 (2013.01); B60C 11/0332 (2013.01);
(Continued)

(58) Field of Classification Search
CPC ........... B60C 9/30; B60C 19/001; B60C 9/17; B60C 9/18
(Continued)

(56) References Cited

U.S. PATENT DOCUMENTS 3,231,000 A * 1/1966 Massoubre ............... B60C 9/30
152/209.26
5,385,187 A * 1/1995 Kajiwara .................. B60C 9/20
152/209.1
(Continued)

FOREIGN PATENT DOCUMENTS

EP    1 586 466    10/2005
EP    2 230 099    9/2010
(Continued)

Primary Examiner — Robert C Dye
Assistant Examiner — Cedrick S Williams
(74) Attorney, Agent, or Firm — Cozen O'Connor

(57) ABSTRACT

Tire formed of two halves separated by a median plane, comprising a crown comprising a crown reinforcement comprising a first reinforcing ply (80) and a second reinforcing ply (90) having two axial ends, which is situated radially on the outside of the first reinforcing ply and surmounted by a hooping reinforcement (100) made up of circumferentially orientated reinforcing elements, in which tire the absolute value of the difference D between the distance D1 of the first axial end (92) from the median plane and the distance D2 of the second axial end (93) from the (Continued)

median plane is greater than or equal to 4 mm and less than or equal to 10 mm (4 mm≤|D|=|D1−D2|≤10 mm).

5 Claims, 3 Drawing Sheets

(51) Int. Cl.
*B60C 15/00* (2006.01)
*B60C 13/00* (2006.01)
*B60C 11/03* (2006.01)
*B60C 9/22* (2006.01)

(52) U.S. Cl.
CPC .............. *B60C 13/00* (2013.01); *B60C 15/00* (2013.01); *B60C 2009/2233* (2013.01); *B60C 2009/2271* (2013.01)

(58) Field of Classification Search
USPC ........................................................ 152/527
See application file for complete search history.

(56) References Cited

U.S. PATENT DOCUMENTS

| | | | | |
|---|---|---|---|---|
| 5,849,121 A | * | 12/1998 | Reuter | ............... B60C 9/0042 |
| | | | | 152/527 |
| 6,533,012 B1 | * | 3/2003 | Jardine | ................. B60C 9/22 |
| | | | | 152/526 |
| 2006/0048879 A1 | * | 3/2006 | Kuwayama | ............ B60C 9/20 |
| | | | | 152/534 |
| 2013/0299058 A1 | | 11/2013 | Pirotte | |

FOREIGN PATENT DOCUMENTS

| | | | | |
|---|---|---|---|---|
| JP | 06001110 | A | * | 6/1992 |
| JP | 06001110 | A | * | 1/1994 |
| JP | 06001110 | A | * | 6/1994 |
| JP | 2001233017 | A | * | 8/2001 |
| JP | 4441041 | B2 | * | 3/2010 |
| JP | 4441041 | B2 | * | 3/2010 |
| WO | WO 01/34412 | | | 5/2001 |
| WO | WO 2012/065939 | | | 5/2012 |

\* cited by examiner

TIRE WITH ASYMMETRIC CROWN

RELATED APPLICATIONS

This application is a U.S. National Phase Application under 35 USC § 371 of International Application PCT/EP2013/076165 filed Dec. 11, 2013.

This application claims the priority of French application no. 1262406 filed Dec. 20, 2012 and of U.S. provisional application No. 61/768,947 filed Feb. 25, 2013, the contents of all of which are hereby incorporated by reference.

FIELD OF THE INVENTION

The present invention relates to passenger vehicle tires and to tire-wheel assemblies comprising passenger vehicle tires.

BACKGROUND

The way in which a vehicle fitted with passenger vehicle tires behaves is dependent on a whole host of parameters, both related to the vehicle and related to the tire-wheel assemblies. Some of these parameters include the offset of the wheels with respect to the vehicle. By changing this offset it is possible to have a significant influence on how the vehicle behaves and on the feedback the driver experiences. It is possible to change the offset by changing the wheel design or by using spacers positioned between the wheel and the hub.

When a tire is developed for a given vehicle, changing the wheel design or using spacers is not always conceivable. This is because, as a rule, tires of different design or brands may be mounted on the vehicle and the wheel offset required in order to achieve the desired behaviour may differ according to the tire design or brand.

One solution to this problem has been put forward in patent application WO 2012/065939. There, the lateral shift is obtained using asymmetric beads.

SUMMARY OF THE INVENTION

It is one of the objectives of the present invention to allow the offset of a tire-wheel assembly with respect to the vehicle to be modified without changing the wheel or using spacers, and without entailing modifications to the bead of the tire.

This objective is achieved by modifying the crown of the tires used in such assemblies so as to shift laterally the centre of mass of the vertical forces acting between the tire and the road.

More specifically, the objective is achieved using a tire having an axis of rotation and comprising two beads designed to come into contact with a mounting rim, each bead comprising at least one annular reinforcing structure, so as to define a median plane of the tire that separates a first half of the tire and a second half of the tire, this median plane being defined as the plane perpendicular to the axis of rotation which lies equidistant from the annular reinforcing structures of the two beads; and two sidewalls extending the beads radially outwards, the two sidewalls meeting in a crown comprising a crown reinforcement comprising a first reinforcing ply and a second reinforcing ply, the second reinforcing ply being positioned radially on the outside of the first reinforcing ply, the crown reinforcement being surmounted by a hooping reinforcement made up of circumferentially orientated reinforcing elements, preferably wound in a spiral, the hooping reinforcement being itself surmounted by a tread;

in which the second reinforcing ply has, in any radial section, a first axial end situated in the first half of the tire, and a second axial end, situated in the second half of the tire, the absolute value of the difference D between the distance D1 of the first axial end from the median plane and the distance D2 of the second axial end from the median plane being greater than or equal to 4 mm and less than or equal to 10 mm (4 mm≤|D|=|D1−D2|≤10 mm);

and in which, in any radial section, $$\sum_{j=1}^{N2} MA2_j = K \times \sum_{i=1}^{N1} MA1_i$$

where K is greater than or equal to 1.15 and less than or equal to 1.50, N1 is the number of hooping reinforcing elements situated in the first half of the tire and $MA1_i$ denotes the modulus at 2% elongation of an individual reinforcing element situated in the first half of the tire, N2 is the number of hooping reinforcing elements situated in the second half of the tire, and $MA2_j$ denotes the modulus at 2% elongation of an individual reinforcing element situated in the second half of the tire.

By using such tires, it is possible to obtain lateral shifts of the centre of mass of the vertical forces acting between the tire and the road that are equivalent to those obtained on the tire-wheel assembly using spacers that are 1 to 5 millimeters thick.

It is possible to make the manufacture of the tire easier by making not only the second, but also the first, reinforcing ply asymmetric. According to this preferred embodiment, the first reinforcing ply has, in any radial section, a first axial end situated in the first half of the tire, and a second axial end, situated in the second half of the tire, the absolute value of the difference D' between the distance D1' of the first axial end from the median plane and the distance D2' of the second axial end from the median plane being non-zero and less than or equal to D, the differences D and D' having the same sign (D·D'>0).

For preference, just one type of reinforcing element is used so that all the reinforcing elements that make up the hooping reinforcement have the same modulus at 2% elongation. The claimed effect is then achieved by varying the number of hooping reinforcing elements situated in the first and in the second half of the tire.

For preference, the reinforcing elements that make up the hooping reinforcement are made of textile materials, such as PET, nylon, rayon, aramid for example.

It is possible to improve the results obtained still further and, in particular, to avoid excessive conicity thrust, by limiting the range of values adopted by the quantities D and K. For preference, the values of D and K also satisfy the following inequality:

$$0.030 \leq \frac{(K-1)}{D[\text{mm}]} \leq 0.090$$

and more preferably still, the following inequality:

$$0.045 \leq \frac{(K-1)}{D[\text{mm}]} \leq 0.075$$

The "conicity thrust" corresponds to a transverse force FyC generated by the tire when running at a zero cornering angle and zero camber angle. The particular characteristic of this force FyC is that it changes sign when the direction in which the tire is fitted to the wheel is reversed, unlike "ply steer thrust" (FyP), the sign of which remains unchanged for this same reversal. Manufacturers need to gain control over the thrusts FyC and FyP in order to avoid causing impaired vehicle stability when the vehicle is driving in a straight line (steering pull).

Of course, it is possible and may even be advantageous to combine the invention with the teaching of document WO 2012/065939 and to provide a tire comprising an asymmetric crown and asymmetric beads.

DETAILED DESCRIPTION OF THE DRAWINGS

Figure 1:
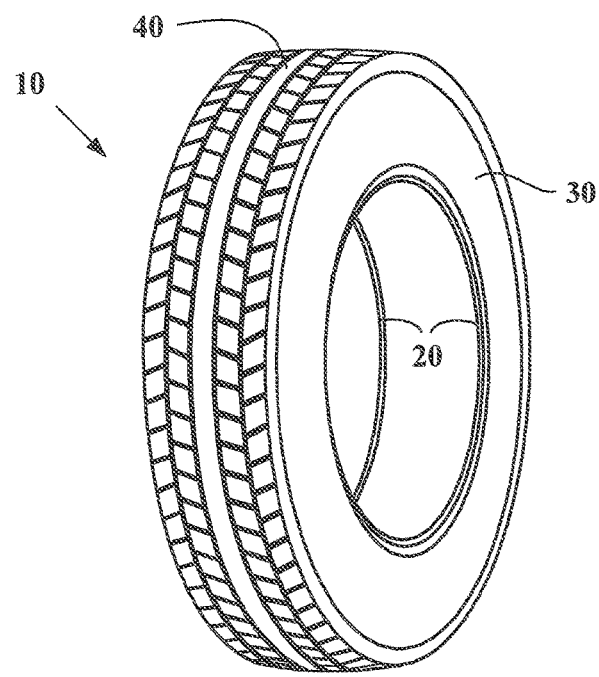
FIG. 1 depicts a tire according to the prior art.

When using the term "radial" it is appropriate to make a distinction between the various uses made of this word by those skilled in the art. Firstly, the expression refers to a radius of the tire. It is in this sense that a point P1 is said to be "radially inside" a point P2 (or "radially on the inside of" the point P2) if it is closer to the axis of rotation of the tire than is the point P2. Conversely, a point P3 is said to be "radially outside" a point P4 (or "radially on the outside of" the point P4) if it is further away from the axis of rotation of the tire than is the point P4. Progress will be said to be "radially inwards (or outwards)" when it is in the direction towards small (or larger) radii. It is this sense of the term that applies also when matters of radial distances are being discussed.

By contrast, a thread or reinforcement is said to be "radial" when the thread or the reinforcing elements of the reinforcement make an angle greater than or equal to 80° and less than or equal to 90° with the circumferential direction. Let us specify that, in this document, the term "thread" is to be understood in a very general sense and comprises threads in the form of monofilaments, multifilaments, cords, folded yarns or equivalent assemblies, irrespective of the material of which the thread is made or of the surface treatment it has received in order to encourage it to bond with the rubber.

Finally, a "radial section" or "radial cross section" here means a section or cross section on a plane containing the axis of rotation of the tire.

An "axial" direction is a direction parallel to the axis of rotation of the tire. A point P5 is said to be "axially inside" a point P6 (or "axially on the inside of" the point P6) if it is closer to the median plane of the tire than is the point P6. Conversely, a point P7 is said to be "axially outside" a point P8 (or "axially on the outside of" the point P8) if it is further from the median plane of the tire than is the point P8. The "median plane" of the tire is the plane which is perpendicular to the axis of rotation of the tire and which lies equidistant from the annular reinforcing structures of each bead. When the median plane is said to separate, in any radial section, the tire into two tire "halves", that does not mean that the median plane necessarily constitutes a plane of symmetry of the tire. The expression "tire half" has a broader meaning here and denotes a portion of the tire that has an axial width close to half the axial width of the tire.

A "circumferential" direction is a direction which is perpendicular both to a radius of the tire and to the axial direction.

In the context of this document, the expression "rubber composition" denotes a composition of rubber containing at least one elastomer and a filler.

Where "modulus at 2% elongation" is mentioned here, this is the values that the reinforcing elements have before they are incorporated into the tire.

The reinforcing elements used in the hooping reinforcements of passenger vehicle tires are preferably of a textile nature. Before their modulus at 2% elongation is measured, these reinforcing elements have to undergo prior conditioning; what is meant by "prior conditioning" is that the reinforcing elements (after drying) are stored for at least 24 hours, prior to measurement, in a standard atmosphere in accordance with European standard DIN EN 20139 (temperature of 20±2° C.; relative humidity of 65±2%).

Next, the force-elongation curve is measured in way well known to those skilled in the art using an "INSTRON" tensile test machine (see also standard ASTM D 885-06). The test specimens tested undergo tension over an initial length L0 (mm) at a nominal rate of L0 mm/min, under a standard pretension of 0.5 cN/tex (averaged over at least 10 measurements). The modulus at 2% elongation is then determined from the force-elongation curve.

In the case of metal reinforcing elements, the elongation modulus is determined in accordance with the ISO 6892 standard.

FIG. 1 schematically depicts a tire 10 according to the prior art. The tire 10 comprises a crown comprising a crown reinforcement (not visible in FIG. 1) surmounted by a tread 40, two sidewalls 30 extending the crown radially inwards, and two beads 20 radially on the inside of the sidewalls 30.

Figure 2:
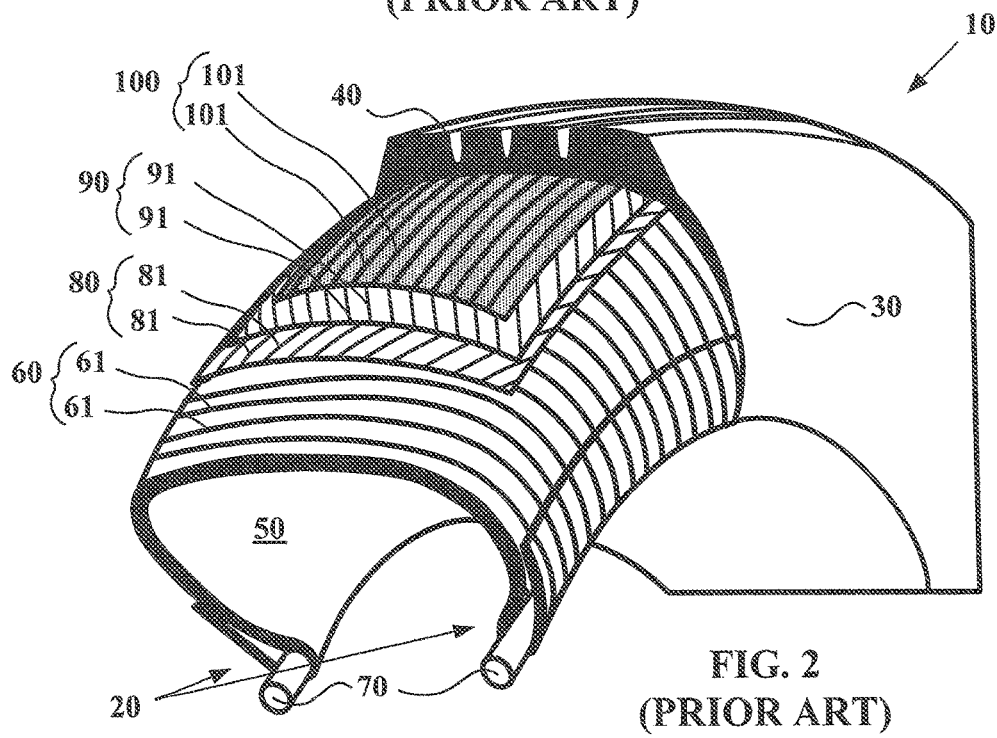
FIG. 2 depicts a partial perspective view of a tire according to the prior art.

FIG. 2 schematically depicts a partial perspective view of another tire 10 according to the prior art and illustrates the various components of the tire. The tire 10 comprises a carcass reinforcement 60 made up of threads 61 coated with rubber composition, and two beads 20 each comprising circumferential reinforcements 70 (in this instance, bead wires) which hold the tire 10 on the rim (not depicted). The carcass reinforcement 60 is anchored in each of the beads 20. The tire 10 further comprises a crown reinforcement comprising two plies 80 and 90. Each of the plies 80 and 90 is reinforced with thread-like reinforcing elements 81 and 91 which are parallel within each layer and crossed from one layer to the other, making angles of between 10° and 70° with the circumferential direction. The tire further comprises a hooping reinforcement 100, positioned radially on the outside of the crown reinforcement, this hooping reinforcement being formed of circumferentially orientated reinforcing elements 101 wound in a spiral. A tread 40 is laid on the hooping reinforcement; it is via this tread 40 that the tire 10 makes contact with the road. The tire 10 depicted is a "tubeless" tire: it comprises an "inner liner" 50 made of a rubber composition impervious to the inflation gas, covering the interior surface of the tire.

Figure 3:
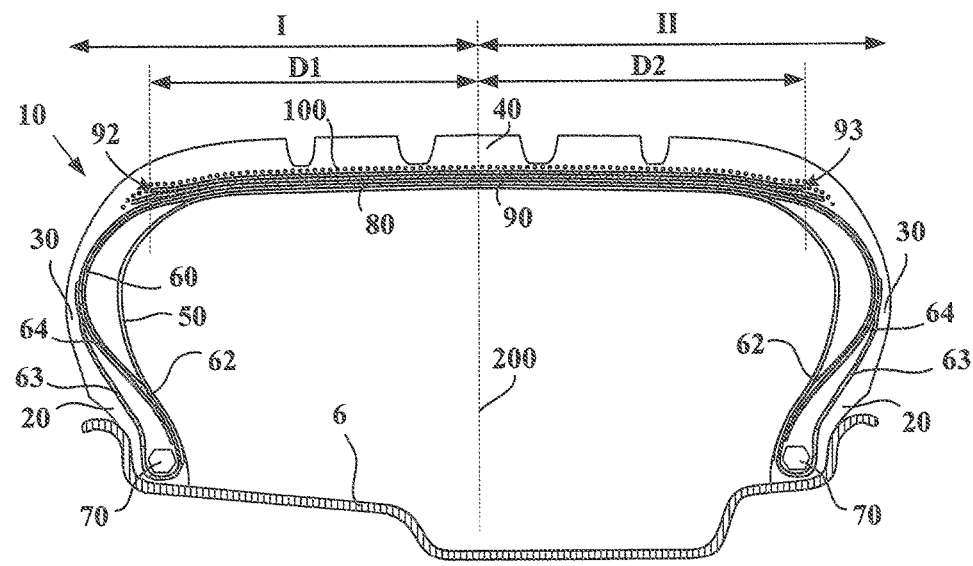
FIG. 3 depicts, in radial cross section, a portion of a tire-wheel assembly comprising a reference tire having symmetric beads.

FIG. 3 depicts, in radial cross section, a portion of a tire-wheel assembly comprising a reference tire 10 of dimension 245/45 R 18. This tire 10 has an axis of rotation that has not been depicted. The tire 10 is mounted on a hollow mounting rim 6 that complies with the ETRTO (European Tire and Rim Technical Organisation) standards.

The tire 10 comprises two beads 20 designed to come into contact with the mounting rim 6. Each bead comprising at least one annular reinforcing structure (in this instance a bead wire 70). The two bead wires 70 define a median plane 200 of the tire which separates a first half I of the tire 10 and a second half II of the tire 10—the median plane 200 is defined as being the plane perpendicular to the axis of rotation and which lies equidistant from the bead wires 70 of the two beads 20.

The tire 10 also comprises two sidewalls 30 extending the beads 20 radially outwards, the two sidewalls 30 meeting in a crown comprising a crown reinforcement comprising a first reinforcing ply 80 and a second reinforcing ply 90, the second reinforcing ply being positioned radially outside of the first reinforcing ply 80. The second reinforcing ply 90 has, in any radial section, a first axial end 92 situated in the first half I of the tire, and a second axial end 93 situated in the second half II of the tire. The second reinforcing ply 90 is symmetric with respect to the median plane 200: the distance D1 of the first axial end 92 from the median plane 200 is equal to the distance D2 of the second axial end 93 from the median plane 200.

The crown reinforcement is surmounted by a hooping reinforcement 100 made up of circumferentially orientated reinforcing elements wound in a spiral in a way well known to those skilled in the art. The hooping reinforcement itself is surmounted by a tread 40. In this particular instance, all the reinforcing elements are identical in terms of their diameter and their chemical nature. There is the same number of reinforcing elements on each side of the median plane 200.

The tire also comprises a carcass reinforcement 60 extending from the beads 20 through the sidewalls 40 as far as the crown. The carcass reinforcement 60 is anchored in the two beads by being turned back around the annular reinforcing structure 70, so as to form within each bead a main portion 62 and a wrapped-around portion 63. In this particular instance, the carcass reinforcement 60 further comprises a second layer 64 likewise extending from the beads 20 through the sidewalls 30 as far as the crown, but not anchored to the annular reinforcing structure 70 by a turned-back portion.

Figure 4:
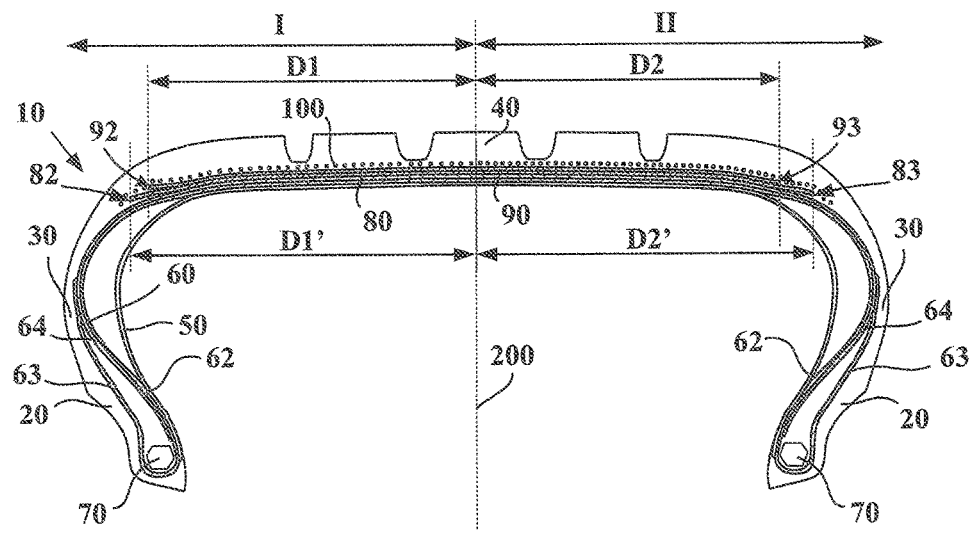
FIG. 4 depicts, in radial cross section, a portion of tire according to an embodiment of the invention.

FIG. 4 depicts, in radial cross section, a portion of a tire 10 according to an embodiment of the invention, likewise of dimension 245/45 R 18. This tire is in all respects similar to the tire depicted in FIG. 3 except for the reinforcing plies 80 and 90 of the crown reinforcement and the hooping reinforcement 100.

The absolute value of the difference D between the distance D1 of the first axial end 92 of the reinforcing ply 90 from the median plane 200 and the distance D2 of the second axial end 93 of the reinforcing ply 90 from the median plane 200 (which in this particular instance is less than D1) is equal to 6.5 mm here.

Likewise, the absolute value of the difference D' between the distance D1' of the first axial end 82 of the reinforcing ply 80 from the median plane 200 and the distance D2 of the second axial end 83 of the reinforcing ply 80 from the median plane 200 is equal to 2 mm. D and D' have the same sign.

In addition, in any radial section, $$\sum_{j=1}^{N2} MA2_j = 1.4 \times \sum_{i=1}^{N1} MA1_i$$

In this particular instance, all the reinforcing elements are identical with regard to their diameter and their chemical nature (they are 140×2 tex nylon threads), which means that $MA1_i = MA2_j$ independently of i and j. The above equation therefore in this particular instance can be reduced to N2=1.4×N1. In this particular instance, N2=163 and N1=117. In other words, the mean laying pitch of the hooping reinforcement 100 in the first half I of the tire is greater than the mean laying pitch of the hooping reinforcement 100 in the second half II of the tire.

Since in FIG. 4 the values D and K of the tire according to an embodiment of the invention are 6.5 mm and 1.4 respectively, a value of (K−1)/D [mm]=0.4/6.5=0.0615 is obtained, which means that the tire meets the preferred conditions stated hereinabove, namely $$0.030 \le \frac{(K-1)}{D[mm]} \le 0.090$$

and $$0.045 \le \frac{(K-1)}{D[mm]} \le 0.075$$

Figure 5:
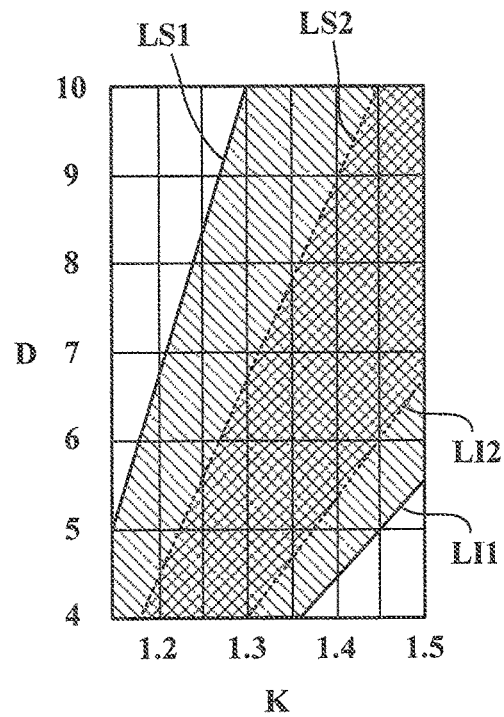
FIG. 5 shows the preferred range of values for the quantities D and K.

FIG. 5 illustrates what these inequalities represent. Specifically, the inequalities characterizing the preferred embodiments delimit preferred zones within the ranges claimed for D (greater than or equal to 4 and less than or equal to 10) and K (greater than or equal to 1.15 and less than or equal to 1.5). The condition $$0.030 \le \frac{(K-1)}{D[mm]} \le 0.090$$

limits the values of D and K to the space defined between the straight lines LS1 and LI1, the condition $$0.045 \le \frac{(K-1)}{D[mm]} \le 0.075$$

to the space bounded between the straight lines LS2 and LI2.

Figure 6:
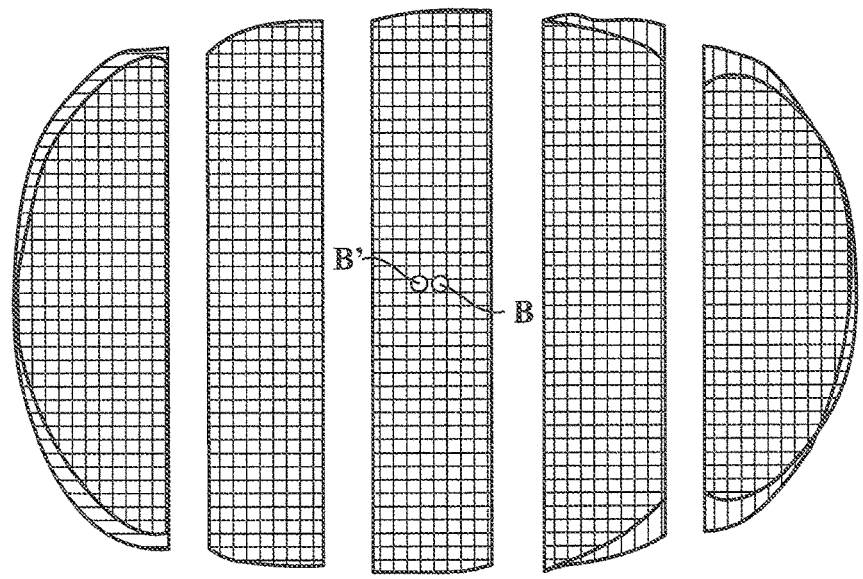
FIG. 6 illustrates the effects obtained with a tire according to an embodiment of the invention.

By using the tire according to an embodiment of the invention (FIG. 4) in place of the reference tire, the centre of mass of the vertical forces acting between the tire and the road has been shifted laterally. FIG. 6 illustrates the result by comparing the contact patch of the reference tire of FIG. 3 (vertical hatching) with that of the tire according to an embodiment of the invention of FIG. 4 (horizontal hatching). Here, the tire is inflated to a pressure of 2.1 bar and loaded to 80% of the ETRTO Load Index; it is driven at a speed of 80 km/h. It may be seen that the centre of mass B' of the contact patch of the tire according to an embodiment of the invention has been shifted by 4 mm by comparison with the centre of mass B of the contact patch of the reference tire. The same shift could have been obtained by altering the wheel offset by 4 mm.

The invention claimed is:

1. A tire having an axis of rotation and comprising:
   two beads configured to come into contact with a mounting rim, each bead comprising at least one annular reinforcing structure, so as to define a median plane of the tire that separates a first half of the tire and a second half of the tire, the median plane being defined as a plane perpendicular to the axis of rotation which lies equidistant from the annular reinforcing structures of the two beads; and
   two sidewalls extending the beads radially outwards, the two sidewalls meeting in a crown comprising a crown reinforcement comprising a first reinforcing ply and a second reinforcing ply, the second reinforcing ply being positioned radially on the outside of the first reinforcing ply, the crown reinforcement being surmounted by a hooping reinforcement made up of circumferentially orientated reinforcing elements wound in a spiral, the hooping reinforcement being itself surmounted by a tread,
   wherein the second reinforcing ply has, in any radial section, a first axial end situated in the first half of the tire, and a second axial end situated in the second half of the tire, a first axial portion of the second reinforcing ply in the first half of the tire, from the median plane to the first axial end, has a greater axial width than a second axial portion of the second reinforcing ply in the second half of the tire, from the median plane to the second axial end, and a difference D between a distance D1 of the first axial end of the second reinforcing ply from the median plane and a distance D2 of the second axial end of the second reinforcing ply from the median plane being greater than or equal to 4 mm and less than or equal to 10 mm (4 mm≤D=D1−D2≤10 mm),
   wherein the first reinforcing ply has, in any radial section, a first axial end situated in the first half of the tire, and a second axial end, situated in the second half of the tire, a first axial portion of the first reinforcing ply in the first half of the tire has a greater axial width, from the median plan to the first axial end, than a second axial portion of the first reinforcing ply in the second half of the tire, from the median plane to the second axial end, and a difference D' between a distance D1' of the first axial end of the first reinforcing ply from the median plane and a distance D2' of the second axial end of the first reinforcing ply from the median plane being greater than zero, the differences D and D' having the same sign (D×D'>0),
   wherein a difference between the distance D2' of the second axial end of the first reinforcing ply from the median plane and the distance D2 of the second axial end of the second reinforcing ply from the median plane is greater than a difference between the distance D1' of the first axial end of the first reinforcing ply from the median plane and the distance D1 of the first axial end of the second reinforcing ply from the median plane (D2'−D2>D1'−D1),
   wherein all the reinforcing elements that make up the hooping reinforcement have the same modulus at 2% elongation, and
   wherein, in any radial section,
   $$N2=K\times N1$$
   where
   K is greater than or equal to 1.15 and less than or equal to 1.50,
   N1 is the number of hooping reinforcing elements situated in the first half of the tire, and
   N2 is the number of hooping reinforcing elements situated in the second half of the tire.

2. The tire of claim 1, wherein the difference D' between the distance D1' of the first axial end of the first reinforcing ply from the median plane and the distance D2' of the second axial end of the first reinforcing ply from the median plane is less than or equal to the difference D between the distance D1 of the second axial end of the second reinforcing ply from the median plane and the distance D2 of the second axial end of the second reinforcing ply from the median plane (0≤D'=D1'−D2'≤D).

3. The tire of claim 1, wherein the reinforcing elements that make up the hooping reinforcement are made of textile materials.

4. The tire of claim 1, wherein the values of D and K also satisfy the following inequality:

$$0.030 \leq \frac{(K-1)}{D[\text{mm}]} \leq 0.090.$$

5. The tire of claim 1, wherein the values of D and K also satisfy the following inequality:

$$0.045 \leq \frac{(K-1)}{D[\text{mm}]} \leq 0.075.$$

* * * * *